United States Patent
Ohsawa

(10) Patent No.: US 10,425,583 B2
(45) Date of Patent: Sep. 24, 2019

(54) IMAGING DEVICE

(71) Applicant: HITACHI KOKUSAI ELECTRIC INC., Tokyo (JP)

(72) Inventor: Tomoya Ohsawa, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/098,012

(22) PCT Filed: Apr. 21, 2017

(86) PCT No.: PCT/JP2017/016042
§ 371 (c)(1),
(2) Date: Oct. 31, 2018

(87) PCT Pub. No.: WO2017/199687
PCT Pub. Date: Nov. 23, 2017

(65) Prior Publication Data
US 2019/0149709 A1    May 16, 2019

(30) Foreign Application Priority Data

May 18, 2016 (JP) ................................. 2016-099889

(51) Int. Cl.
*H04N 5/232* (2006.01)
*H04N 5/374* (2011.01)
*H04N 5/376* (2011.01)

(52) U.S. Cl.
CPC ........... *H04N 5/2327* (2013.01); *H04N 5/232* (2013.01); *H04N 5/374* (2013.01); *H04N 5/3765* (2013.01)

(58) Field of Classification Search
CPC ...... H04N 5/2327; H04N 5/232; H04N 5/374; H04N 5/3765
See application file for complete search history.

(56) References Cited

U.S. PATENT DOCUMENTS 8,804,004 B2 * 8/2014 Kato .................... H04N 5/2357
                                                        348/226.1
9,723,315 B2 * 8/2017 Price .................... H04N 19/172
2012/0092149 A1   4/2012 Fujisawa

FOREIGN PATENT DOCUMENTS

JP    2004-248231 A    9/2004
JP    2005-64586 A     3/2005
(Continued)

OTHER PUBLICATIONS

International Search Report issued by the Japan Patent Office for corresponding International Patent Application No. PCT/JP2017/016042, dated Jul. 4, 2017, with an English translation.

(Continued)

*Primary Examiner* — Twyler L Haskins
*Assistant Examiner* — Fayez Bhuiyan
(74) *Attorney, Agent, or Firm* — Myers Wolin, LLC

(57) ABSTRACT

An imaging device captures an object. The imaging device includes: an imaging unit that captures the object and outputs video data; a memory unit that stores therein the video data from the imaging unit; a video signal processing unit that reads the video data from the memory unit at a frame rate lower than a frame rate at which the video data are written into the memory unit and performs signal processing on the video data; an output interface unit that outputs to an external device the video data; and a control unit that outputs to the imaging unit an instruction to capture the specific number of frames and to write video data into the memory unit as an exposure period signal, instructs the video signal processing unit to output the video data from the memory unit, and outputs to the external device an imaging period signal.

3 Claims, 7 Drawing Sheets

(56) References Cited

FOREIGN PATENT DOCUMENTS

| | | |
|---|---|---|
| JP | 2010-74221 A | 4/2010 |
| JP | 4605216 B2 | 10/2010 |
| JP | 2010-266259 A | 11/2010 |
| JP | 2012-99977 A | 5/2012 |
| JP | 5037425 B2 | 7/2012 |
| JP | 5167676 B2 | 1/2013 |
| JP | 5201257 B2 | 2/2013 |

OTHER PUBLICATIONS

Written Opinion of the International Searching Authority issued for corresponding International Patent Application No. PCT/JP2017/016042, dated Jul. 4, 2017, with an English translation.
International Preliminary Report on Patentability issued by the International Bureau of Wipo for corresponding International Patent Application No. PCT/JP2017/016042, dated Nov. 20, 2018, with an English translation.

* cited by examiner

IMAGING DEVICE

CROSS REFERENCE TO RELATED APPLICATIONS

The present disclosure is a national phase filing under 35 U.S.C. § 371 of International Patent Application No. PCT/JP2017/016042 filed on Apr. 21, 2017, which claims priority to Japanese Patent Application No. 2016-099889 filed on May 18, 2016, the disclosures of each of which are expressly incorporated herein by reference in their entireties.

TECHNICAL FIELD

The present invention relates to an imaging device that is used for inspection applications or the like, and particularly relates to an imaging device that enables a reduction in inspection time and an increase in throughput without dropping images.

BACKGROUND ART

[Explanation for Conventional Art]

A high-pixel and high frame-rate imaging element may be employed as an imaging device for product inspection.

On the other hand, an output interface of an imaging device used for FA (Factory Automation) includes USB3.0, Gigabit Ethernet ("Ethernet" is registered trademark), CameraLink, and the like, but has limitations from the viewpoint of an amount of data that can be transmitted per a unit time due to band limiting and thus has a small amount of transmission data compared to an amount of output data of an imaging element.

Data conversion can be performed from a high frame rate (imaging frame rate) of an imaging element to a low frame rate (transmission frame rate) of an output interface by thinning out frames from the imaging element. However, because the thinned-out frames are not transmitted, this method is unsuitable for product inspection.

A conventional imaging device, which writes the predetermined number of frames required for inspection into a memory at a high imaging frame rate and reads the frames at a low transmission frame rate, enables data transmission without dropping images (frame dropping). However, the conventional imaging device cannot perform the inspection on the next product until the set number of images are read.

[Conventional Imaging Device: FIG. 6]

The configuration of a conventional imaging device will be explained with reference to FIG. 6. FIG. 6 is a block diagram illustrating the configuration of the conventional imaging device.

As illustrated in FIG. 6, the conventional imaging device includes an imaging element 11, a serial-parallel conversion unit 12, a memory unit 13, a video signal processing unit 14, an interface output processing unit 15, and a control unit 16.

The imaging element 11 converts electric charges generated in accordance with incident light into digital data and outputs the digital data at a high imaging frame rate.

The serial-parallel conversion unit 12 converts serial data input from the imaging element 11 into parallel data and writes the parallel data into the memory unit 13.

The memory unit 13 stores therein the written image data by the predetermined number of images (frames).

The video signal processing unit 14 performs signal processing required for transmission.

The interface output processing unit 15 outputs the image data at a predetermined transmission frame rate.

The control unit 16 controls each component of the imaging device based on setting from the outside and outputs timing signals to each component to make each component perform the imaging of an object and the output of video.

Moreover, the imaging device is connected to an inspection device that performs inspection based on the captured images and an object moving apparatus that moves a product (board etc.) as an object. When an imaging start signal is input from the external object moving apparatus, the control unit 16 instructs the imaging element 11 to start to capture this object.

Then, the image data captured by the imaging device is transmitted to, for example, the inspection device from the interface output processing unit 15 to be determined as to whether the product is good or bad.

[Control Timing of Conventional Imaging Device: FIG. 7]

Next, control timing of the conventional imaging device will be explained with reference to FIG. 7. FIG. 7 is a timing diagram illustrating control timing in the conventional imaging device.

First, as illustrated in FIG. 7(a), when an imaging start signal is input from the outside (object moving apparatus), the control unit 16 outputs an exposure period signal to the imaging element 11 as illustrated in FIG. 7(b). Herein, it is assumed that 50 frames per one object are captured.

The exposure period signal is a signal for providing the timings of the start and end of exposure and the output start of data to the imaging element 11.

In other words, the imaging element 11 starts exposure when the exposure period signal becomes a high level. When the exposure period signal becomes a low level, the imaging element 11 terminates exposure for one frame and outputs serial data to the serial-parallel conversion unit 12 at high speed.

Then, as illustrated in FIG. 7(c), the data output from the imaging element 11 are written into the memory unit 13 via the serial-parallel conversion unit 12 at high speed.

On the other hand, as illustrated in FIG. 7(d), the data written into the memory unit 13 are sequentially output from the interface output processing unit 15 to the inspection device. However, because a transmission frame rate is slow, reading needs a time compared to writing.

When confirming that the inspection device acquires images for 50 frames, the object moving apparatus determines that this object has been completely captured and shifts to an operation for an object moving period to start to move the object.

Because the imaging device does not perform imaging until the next imaging start signal is input from the object moving apparatus, the imaging device does not perform imaging while the object is moving.

Then, when the movement of the object is completed, the next imaging start signal is input from the object moving apparatus and the next object is similarly captured as illustrated in FIG. 7(a).

As described above, because the conventional imaging device has the low transmission frame rate of the interface output processing unit 15 compared to the imaging frame rate of the imaging element 11 and the object moving apparatus cannot start to move the object until the reading of the set number of image data is completed, the entire inspection requires time and thus high throughput cannot be obtained.

RELATED ART

A conventional technology on an imaging device used for FA includes Japanese Patent Application Laid-Open No.

2005-063586 "Imaging device for inspection and sorting machine including imaging-timing automatic detection function" (JAI corporation, Patent Document 1), Japanese Patent No. 05167676 "Imaging device and imaging method" (Sony Corporation, Patent Document 2), Japanese Patent No. 04605216 "Imaging device and imaging method" (Sony Corporation, Patent Document 3), Japanese Patent No. 05201257 "Image regeneration device, image regeneration method, and imaging device" (Sony Corporation, Patent Document 4), Japanese Patent No. 05037425 "High-speed imaging device" (TOSHIBA IT control system, Patent Document 5), Japanese Patent Application Laid-Open No. 2010-074221 "Data collection device" (Shinano Kenshi Co., Ltd., Patent Document 6), and Japanese Patent Application Laid-Open No. 2012-099977 "Moving image capturing apparatus, moving image observation method, moving image observation program, and recording medium readable by computer" (KEYENCE Corporation, Patent Document 7).

CITATION LIST

Patent Documents

Patent Document 1: Japanese Patent Application Laid-Open No. 2005-064586
Patent Document 2: Japanese Patent No. 05167676
Patent Document 3: Japanese Patent No. 04605216
Patent Document 4: Japanese Patent No. 05201257
Patent Document 5: Japanese Patent No. 05037425
Patent Document 6: Japanese Patent Application Laid-Open No. 2010-074221
Patent Document 7: Japanese Patent Application Laid-Open No. 2012-099977

SUMMARY OF THE INVENTION

Problems to be Solved by the Invention

As described above, because the object moving apparatus cannot start to move an object until the reading of the set number of image data is completed, the conventional imaging device has a problem that a standby time before starting to capture the next object is lengthened and the throughput of inspection is not improved.

Moreover, Patent Documents 1 to 7 do not disclose that a signal reporting the completion of an imaging period is output to an external device to start to move the object.

The present invention has been achieved in view of the above problems, and an object of the invention is to provide an imaging device that reports the completion of imaging to the outside to enable the movement of an object while performing the reading of image data and to enable the improvement of the inspection throughput without dropping images.

Means for Solving the Problems

To solve the problem of the conventional example, the present invention provides an imaging device that captures an object, the imaging device including: an imaging unit that captures the object and outputs video data; a memory unit that stores therein the video data from the imaging unit by a specific number of frames; a video signal processing unit that reads the video data from the memory unit at a frame rate lower than a frame rate at which the video data are written into the memory unit and performs signal processing on the video data; an output interface unit that outputs to an external device the video data from the video signal processing unit at the low frame rate; and when an imaging start signal is input from the external device, a control unit that outputs to the imaging unit an instruction to capture the specific number of frames and to write video data into the memory unit as an exposure period signal, instructs the video signal processing unit to output the video data from the memory unit at the low frame rate, and outputs to the external device an imaging period signal indicating an imaging period during which the specific number of frames are captured, when an imaging start signal is input from the external device.

Moreover, in the imaging device, the imaging period signal is intermittent pulse signals to repeat an ON state and an OFF state in synchronization with the exposure period signal.

Moreover, in the imaging device, the imaging period signal is a pulse signal to continue an ON state over an entire period in which a specific number of intermittent pulse signals for the exposure period signal are output.

Advantageous Effect of the Invention

According to the present invention, because an imaging device that captures an object includes: an imaging unit that captures the object and outputs video data; a memory unit that stores therein the video data from the imaging unit by a specific number of frames; a video signal processing unit that reads the video data from the memory unit at a frame rate lower than a frame rate at which the video data are written into the memory unit and performs signal processing on the video data; an output interface unit that outputs to an external device the video data from the video signal processing unit at the low frame rate; and when an imaging start signal is input from the external device, a control unit that outputs to the imaging unit an instruction to capture the specific number of frames and to write video data into the memory unit as an exposure period signal, instructs the video signal processing unit to output the video data from the memory unit at the low frame rate, and outputs to the external device an imaging period signal indicating an imaging period during which the specific number of frames are captured, the present invention has the effect that the external device can grasp the end of the imaging period based on the imaging period signal to start the movement of the object and the imaging device utilizes a period, in which the output interface unit outputs video data at the low frame rate, for the movement of the object to enable the shortening of a standby time of imaging and to enable the improvement of the inspection throughput without dropping images.

Moreover, according to the present invention, because the imaging period signal is intermittent pulse signals to repeat an ON state and an OFF state in synchronization with the exposure period signal in the imaging device, the present invention has the effect that the imaging device has a simple configuration without generating a special signal by using the exposure period signal as the imaging period signal.

Furthermore, according to the present invention, because the imaging period signal is a pulse signal to continue an ON state over an entire period in which a specific number of intermittent pulse signals for the exposure period signal are output in the imaging device, the present invention has the effect that the external device can easily detect a falling edge of the pulse signal because the imaging period signal becomes an ON state when imaging for the specific number of frames is started with respect to this object and becomes an OFF state when the imaging is completed.

MODE FOR CARRYING OUT THE INVENTION

The embodiment of the present invention will be explained with reference to the accompanying drawings.

Overview of Embodiment

An imaging device according to the embodiment of the present invention includes: an imaging element that captures an image and outputs the image at a high imaging frame rate; a memory unit that stores image data (video data) captured by the imaging element; a video signal processing unit that reads the image data from the memory unit at a transmission frame rate lower than the imaging frame rate and performs signal processing on the image data; an output interface unit that outputs the image data to the outside at the transmission frame rate; and a control unit outputs to the imaging element an exposure period signal giving an instruction to capture a predetermined number of frames and outputs to an external object moving apparatus the exposure period signal as an imaging period signal indicating an imaging period. According to this, the imaging device reports the effect that the imaging of this object is completed to the object moving apparatus to start the movement of the object and thus can utilize a time in which image data are output at the low transmission frame rate for the movement of the object to transmit image data without frame dropping and to improve the throughput of inspection.

Figure 1:
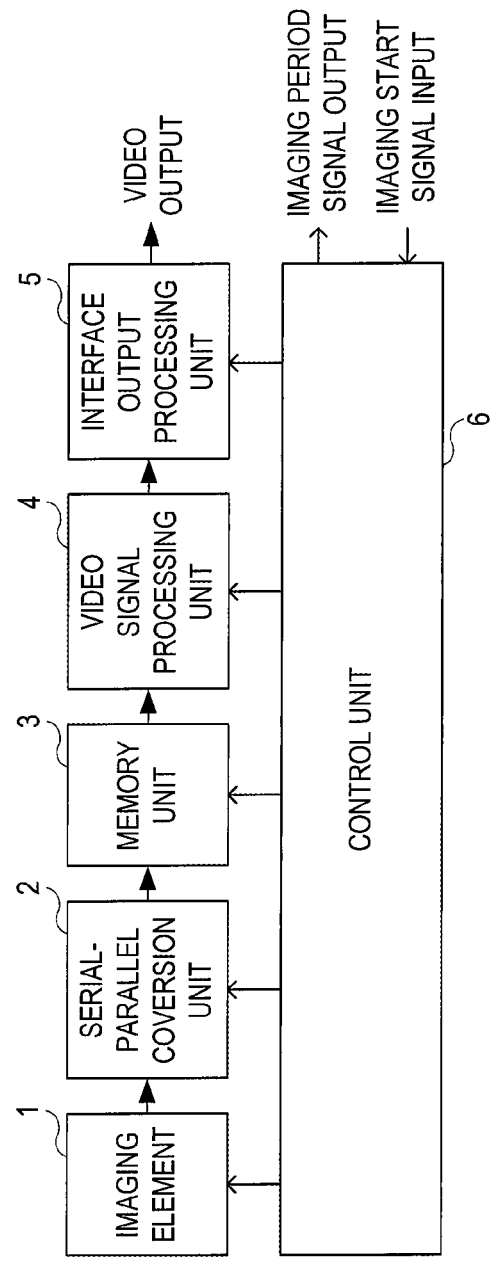
FIG. 1 is a block diagram illustrating the configuration of an imaging device according to an embodiment of the present invention.

[Configuration of Imaging Device According to Embodiment: FIG. 1]

The configuration of an imaging device according to the embodiment of the present invention will be explained with reference to FIG. 1. FIG. 1 is a block diagram illustrating the configuration of the imaging device according to the embodiment of the present invention. Moreover, the configuration illustrated in FIG. 1 is common to first and second devices according to the embodiment of the present invention to be described later.

As illustrated in FIG. 1, the imaging device (the present imaging device) according to the embodiment of the present invention includes an imaging element 1, a serial-parallel conversion unit 2, a memory unit 3, a video signal processing unit 4, an interface output processing unit 5, and a control unit 6, similarly to the conventional.

The imaging element 1 includes, for example, a CMOS (Complementary Metal Oxide Semiconductor) element, and converts electric charges generated in accordance with incident light into digital data and outputs serial data.

The serial-parallel conversion unit 2 convert the serial data input from the imaging element 1 into parallel data and writes the parallel data into the memory unit 3 at a higher imaging frame rate than the reading from the memory unit 3.

The memory unit 3 is a frame memory that includes a DDR (Double Data Rate) memory or the like, and stores therein the parallel data from the serial-parallel conversion unit 2 for 50 to 100 pieces (frames), for example.

Herein, the memory unit 3 is read by the video signal processing unit 4 at a low transmission frame rate in a state where the writing of image data from the serial-parallel conversion unit 2 is continued at a high imaging frame rate.

Based on an instruction indicating the start of reading from the control unit 6, the video signal processing unit 4 reads video data from the memory unit 3 at the low transmission frame rate to perform the control etc. in order of signal processing, compression, and reading according to an output interface.

The interface output processing unit 5 is an output interface unit that outputs image data (video data) from the video signal processing unit 4 to an external inspection device at the low transmission frame rate.

The control unit 6 is a characterizing part of the present device, and controls each component of the present device based on setting from the outside to cause each component to capture an image and output image data.

More specifically, by using the input of an imaging start signal from the outside as a trigger, the control unit outputs an exposure period signal to the imaging element 1 to start an imaging operation and also outputs an imaging period signal indicating an imaging period of this object to an external object moving apparatus as the special feature of the present device.

The control unit 6 is a processor that includes at least a processing means and a storage means, and executes a program stored in the storage means by using the processing means to realize the control operation of each component.

Herein, the imaging start signal is adapted to be input from the object moving apparatus, but may be adapted to be input from a sensor etc. that detects the movement of an object.

The signal form of the imaging period signal and the operation of the object moving apparatus accompanied with this have a plurality of modes. In this regard, it will be described below as first and second imaging devices.

Figure 2:
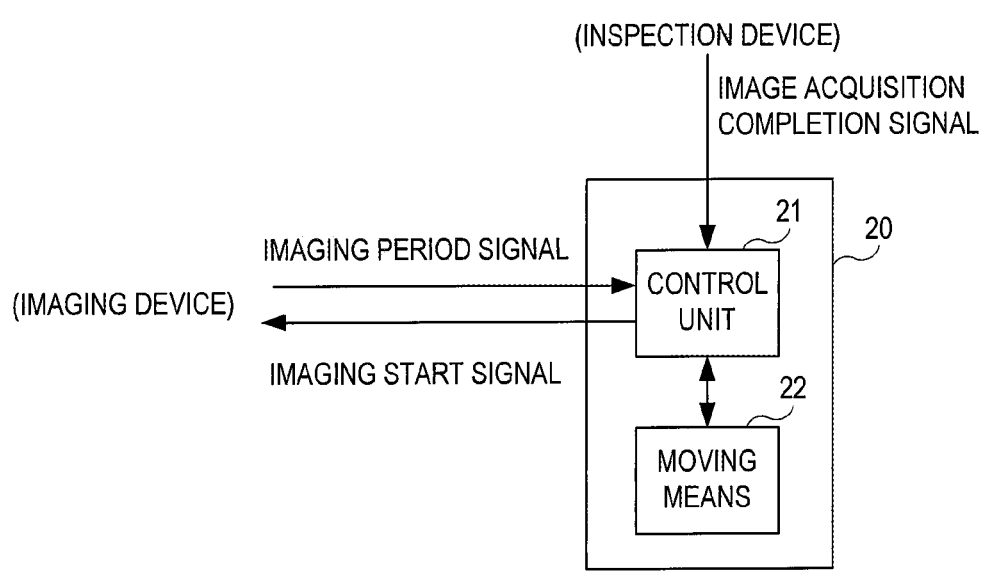
FIG. 2 is a block diagram illustrating the configuration of an object moving apparatus.

[Object Moving Apparatus: FIG. 2]

Before explaining an imaging period signal and an operation accompanied with this, the object moving apparatus connected to the present device will be explained with reference to FIG. 2. FIG. 2 is a block diagram illustrating the configuration of the object moving apparatus.

As illustrated in FIG. 2, the object moving apparatus 20 is an apparatus that is connected to the imaging device (the present device) and the inspection device, includes a control unit 21 and a moving means 22, and moves a product (object) as a target to be inspected. The object moving apparatus 20 may be provided integrally with the inspection device.

The moving means 22 sequentially moves objects to a predetermined position in accordance with the instruction from the control unit 21.

The control unit 21 is a processor that includes at least a processing means and a storage means, and outputs the imaging start signal to the present device and also inputs thereinto the imaging period signal from the present device.

Furthermore, the control unit 21 receives from the inspection device an image acquisition completion signal indicating that the set number of images (the specific number of frames) have been acquired.

Then, the control unit 21 instructs the moving means 22 to start the movement upon detecting the completion of the imaging based on the imaging period signal, and instructs the moving means 22 to stop the movement upon detecting the completion of the movement by using a sensor etc.

Along with that, the control unit 21 checks whether the image acquisition completion signal from the inspection device has been received.

Then, when recognizing that both of the movement of the object and the acquisition of images are completed, the control unit 21 is adapted to output an imaging start signal instructing the present device to start to capture the next object.

These operations are realized by executing a program stored in the storage means by using the processing means of the control unit 21.

Moreover, the object moving apparatus may previously set an imaging period in accordance with inspection items and output the imaging start signal by using the imaging period after the movement of the object is completed, as described later.

Figure 3:
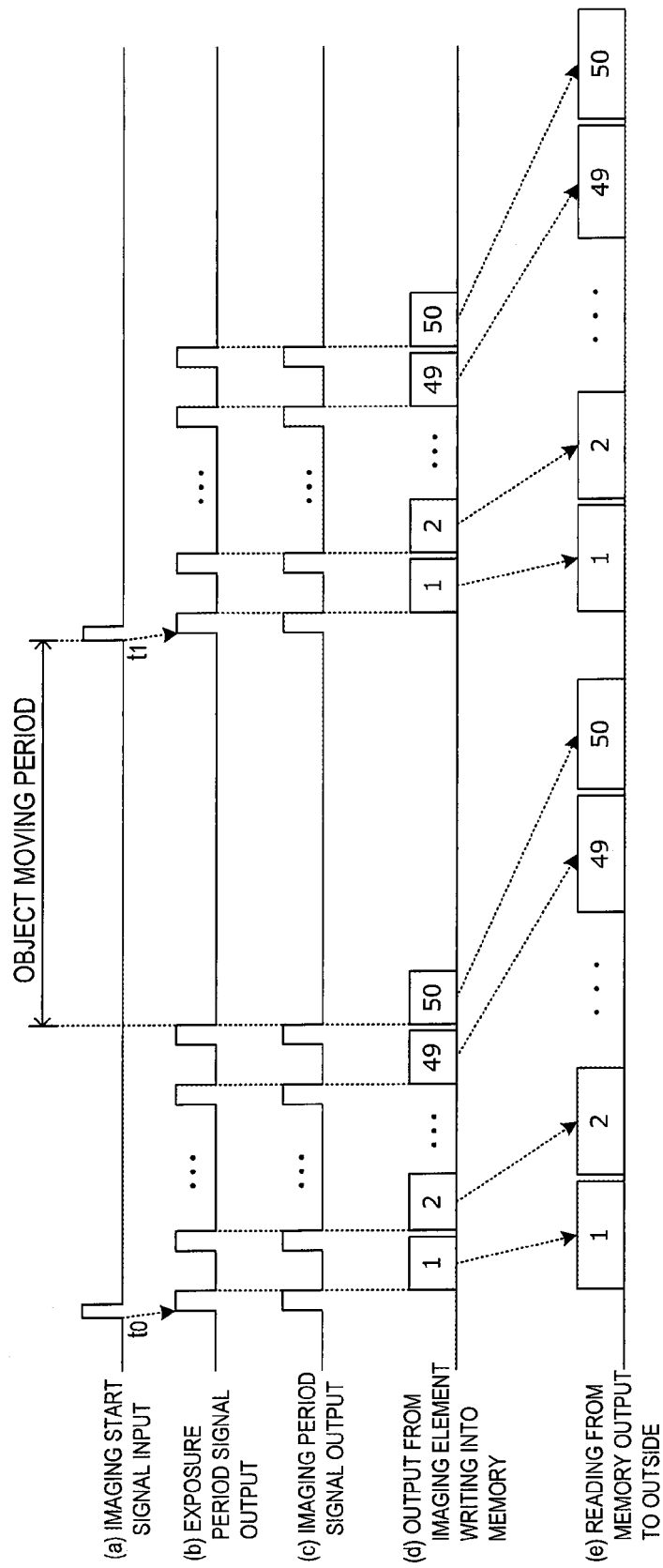
FIG. 3 is a timing diagram illustrating control timing in a first device.

[Control Timing in First Imaging Device: FIG. 3]

Next, control timing in the first imaging device (the first device) according to the embodiment of the present invention will be explained with reference to FIG. 3. FIG. 3 is a timing diagram illustrating control timing in the first device.

Herein, a case where an imaging frame rate is 100 fps (frame per second) and a transmission frame rate is limited to 50 fps depending on a transmission band is explained as an example.

Assuming that one target to be inspected (object) requires images for 50 frames, a time (imaging time) to write the images into the memory unit 3 at the imaging frame rate is 0.5 seconds.

On the other hand, reading the images of 50 frames from the memory unit 3 and transmitting the images require a time (transmission time) of one second.

Because the object may be moved after the imaging of the predetermined number of frames is terminated, the present device including the first device is adapted to use a time corresponding to a difference between the imaging time and the transmission time for the sake of the movement of the object.

As illustrated in FIG. 3(a), when an imaging start signal is first input from the external object moving apparatus 20 at a time t0, the control unit 6 starts to output an exposure period signal to the imaging element 1 (see FIG. 3(b)).

Similarly to the conventional, the exposure period signal is a signal to instruct the imaging element 1 to perform the start and end of exposure and the start of reading of data, and is intermittent pulse signals to alternately repeat a high level (ON state) and a low level (OFF state) at short intervals. A time in which the pulse signal is in a high-level state is an exposure time per one frame.

Then, as illustrated in FIG. 3(c), as the special feature of the first device, the control unit 6 outputs an imaging period signal synchronized with the exposure period signal to the external object moving apparatus 20.

In the first device, the imaging period signal is identical with the exposure period signal. In other words, the imaging period signal indicates an imaging period for one object by using the predetermined number (50) of intermittent pulses.

As a result, the first device can report the imaging period of this object to the outside without generating a separate signal.

The imaging element 1 performs exposure (imaging, capturing) based on the exposure period signal.

More specifically, similarly to the conventional, the imaging element 1 starts exposure when the exposure period signal becomes a high level and stops the exposure when it becomes a low level to complete the imaging of one frame, and starts to output the image data at the high imaging frame rate. The imaging element captures the second frame at the next high level and outputs image data at a low level to perform the imaging for 50 frames in a similar manner.

In the actual inspection, imaging is performed while changing an exposure time and illumination every frame.

The serial data output from the imaging element 1 are converted to parallel data by the serial-parallel conversion unit 2 and are written into the memory unit 3 at the high imaging frame rate (see FIG. 3(d)).

As illustrated in FIG. 3(e), at the same time as the writing, the reading from the memory unit 3 is started at a low transmission frame rate.

Then, as illustrated in FIGS. 3(b) and 3(c), the imaging for this object is terminated when the exposure period signal and imaging period signal corresponding to the 50th exposure fall down.

The control unit 21 of the object moving apparatus 20 monitors the reception of the imaging period signal input from the present device after outputting the imaging start signal at the time t0 in FIG. 3(a), and does not perform the movement of the object until receiving the predetermined number (herein, 50) of pulses that is previously set.

Then, as illustrated in FIG. 3(c), the control unit 21 recognizes that the imaging of the predetermined number of frames is completed upon detecting the falling edge of the 50th pulse, and instructs the moving means 22 to move the object.

Alternatively, the control unit 21 of the object moving apparatus 20 may recognize that the imaging is being performed while sequentially receiving the pulses of the imaging period signal, and recognize the completion of imaging when not receiving the next pulse signal even if a preset specific time passes after receiving the pulse of the imaging period signal.

At this time, as illustrated in FIG. 3(e), the reading of the image data from the memory unit 3 has not yet been ended.

In other words, while performing the reading of image data from the interface output processing unit 5, the object moving apparatus 20 moves the object.

As a result, if the present device is used, the movement of the object can be performed without waiting for the completion of the reading of the set number of images (50 images) at the low frame rate, and thus an interval up to the imaging for the next object can be shortened so as to totally improve throughput.

Moreover, while the object is being moved, the imaging by the imaging element 1 and the writing into the memory unit 3 are not performed.

Then, the control unit 21 of the object moving apparatus 20 checks whether the movement of the object has been completed and whether the image acquisition completion signal is input from the inspection device. When the movement of the object has been completed and the image acquisition completion signal is input, the control unit outputs the next imaging start signal.

In the example of FIG. 3, a slight margin exists between the completion of the acquisition of images (the completion of the reading of the 50th image in FIG. 3(e)) and a time t1 at which the next imaging start signal is output. The reason is to surely prevent the overlap in the memory unit 3.

In this way, the timing control in the first device is performed.

Figure 7:
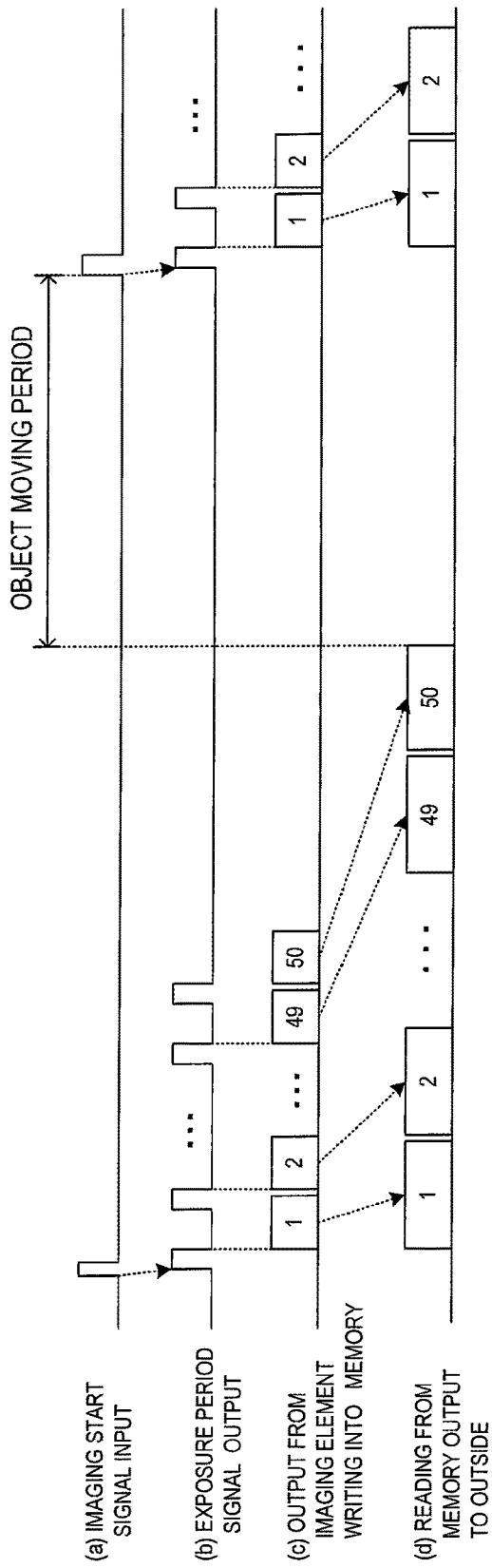
FIG. 7 is a timing diagram illustrating control timing in the conventional imaging device.

The first device outputs the imaging period signal equal to the exposure period signal to the object moving apparatus 20 as a signal reporting an imaging period in order to move the object by using a difference between the high imaging frame rate and the low transmission frame rate. Therefore, the object moving apparatus 20 can recognize a timing at which the movement of the object is enabled to be able to move the object during reading image data. In this way, according to the embodiment, compared to the conventional imaging device illustrated in FIG. 7, an interval between imaging start signals is considerably shortened and an imaging interval is shortened, and thus throughput can be improved even when an existing output interface having band limiting is used.

Moreover, the object moving apparatus 20 connected to the first device is configured to receive the image acquisition completion signal from the inspection device and then output the imaging start signal. Therefore, the embodiment has the effect that the set number of image data can be surely acquired without frame dropping.

Figure 4:
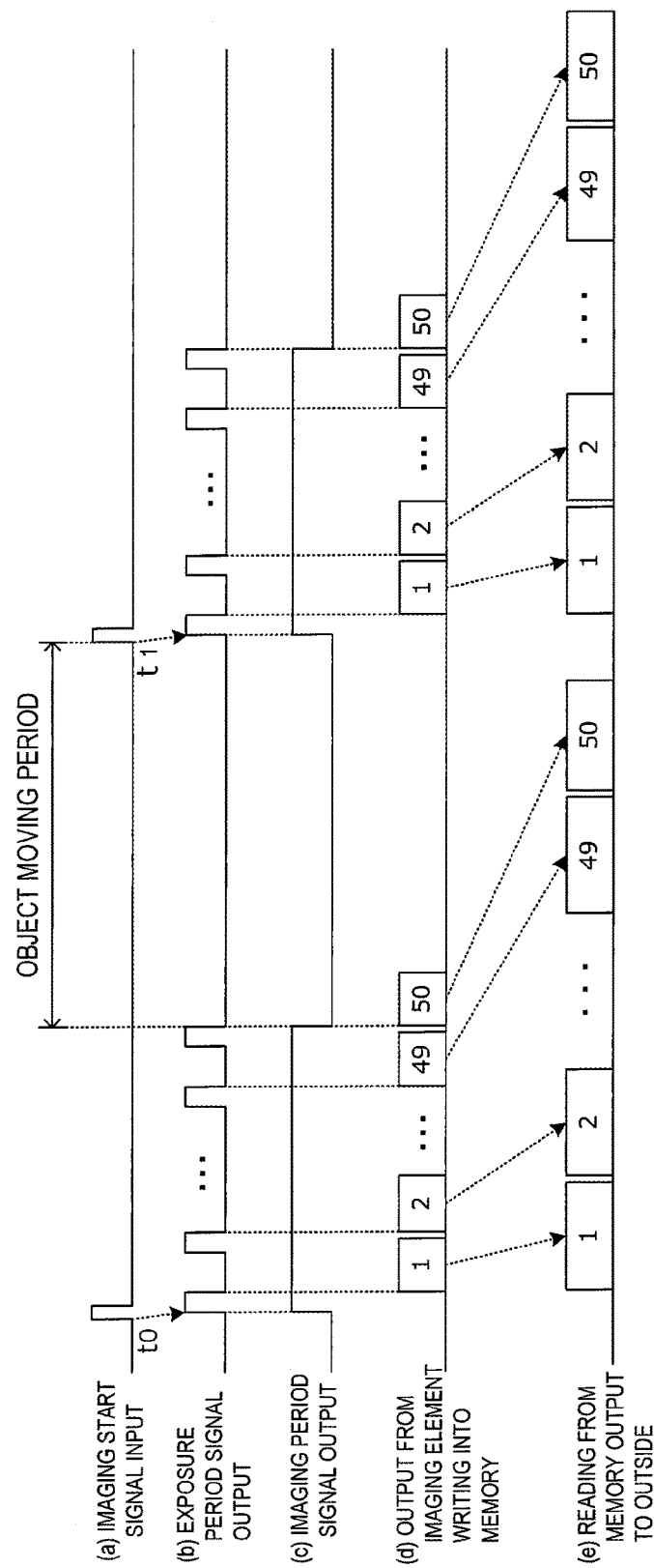
FIG. 4 is a timing diagram illustrating control timing in a second device.

[Control Timing in Second Imaging Device: FIG. 4]

Next, control timing in the second imaging device (the second device) according to the embodiment of the present invention will be explained with reference to FIG. 4. FIG. 4 is a timing diagram illustrating control timing in the second device.

The second device is different from the first device from the viewpoint of the form of an imaging period signal. As illustrated in FIG. 4(c), the imaging period signal (second imaging period signal) of the second device is a pulse signal having a long period compared to an exposure period signal in FIG. 4(b).

More specifically, the second imaging period signal (FIG. 4(c)) is a wide pulse synchronized with the exposure period signal in FIG. 4(b), and is a continuous pulse signal that has a high level over the entire period in which the predetermined number of frames (herein, 50 frames) are captured and that becomes a low level when the imaging is completed.

In other words, the second imaging period signal indicates that the duration of the high level is the imaging period for one object.

Because the second device has a pulse signal having a long period as the imaging period signal, the external object moving apparatus can easily detect the falling edge of the imaging period signal, namely, the completion of imaging.

Then, the second device can report the completion of imaging for this object to the object moving apparatus 20 to start the movement of the object at the same timing as the first device and thus can improve the throughput of inspection without dropping frames.

Figure 5:
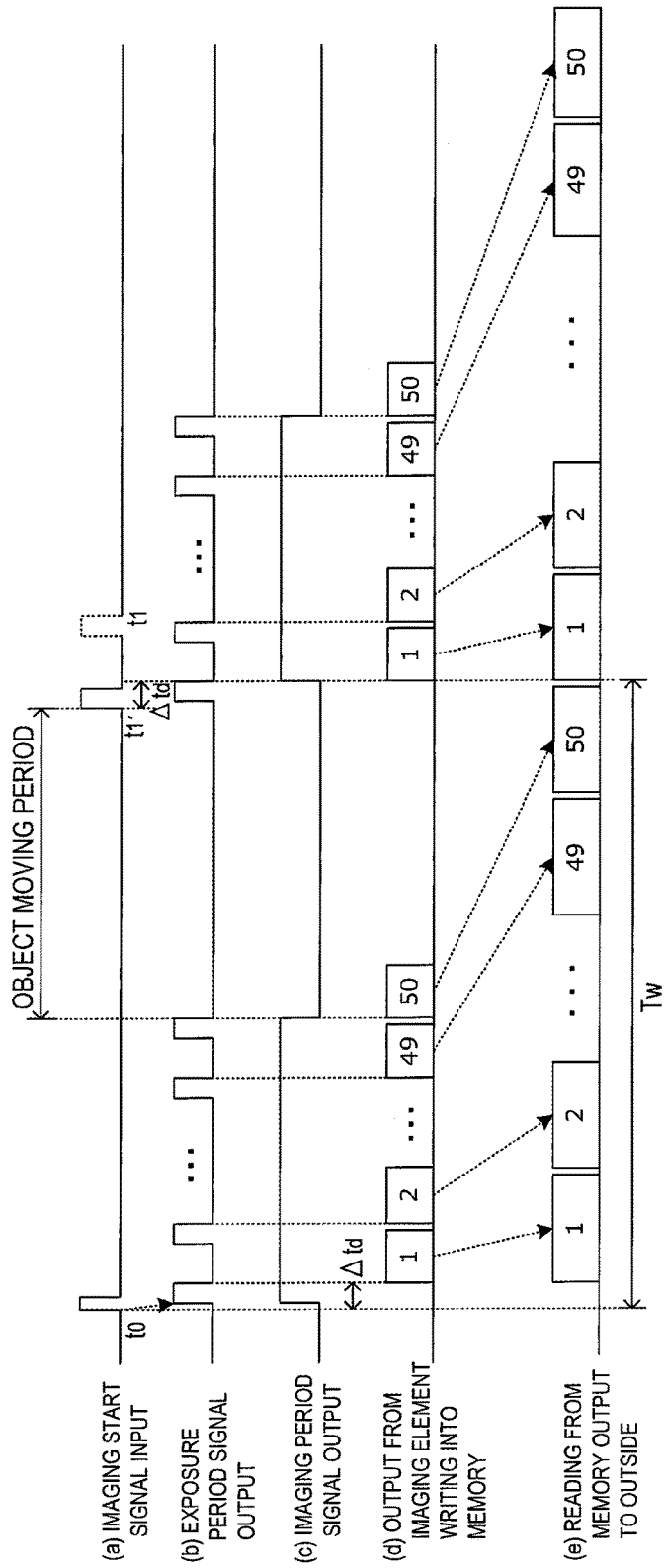
FIG. 5 is a timing diagram illustrating an example of control timing in the object moving apparatus 20.
Figure 6:
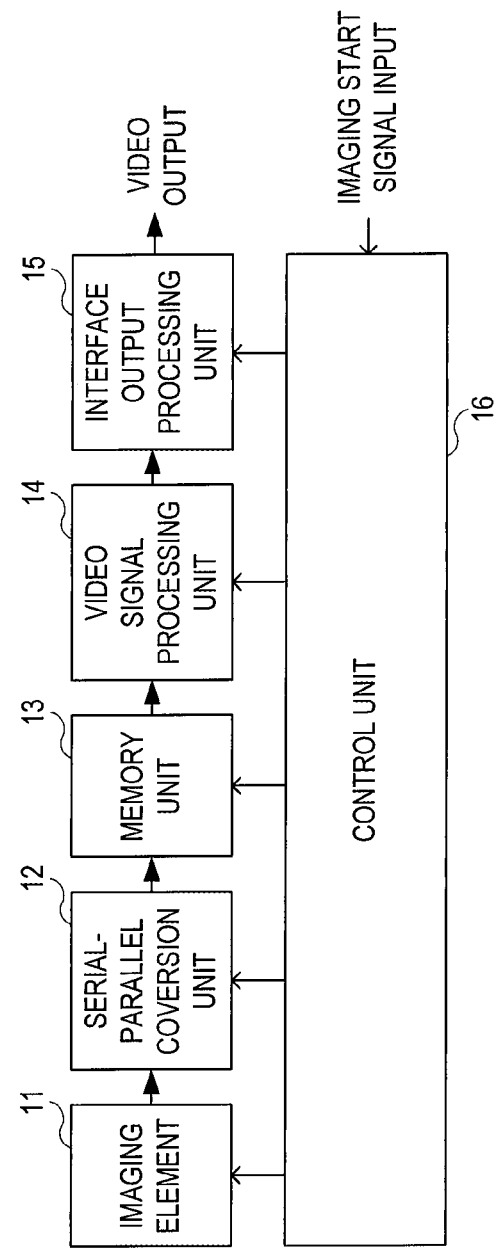
FIG. 6 is a block diagram illustrating the configuration of a conventional imaging device.

[Example of Control Timing in Object Moving Apparatus: FIG. 5]

Next, an example of timing control in the object moving apparatus 20 connected to the present device will be explained with reference to FIG. 5. FIG. 5 is a timing diagram illustrating an example of control timing in the object moving apparatus 20.

The object moving apparatus 20 illustrated in FIGS. 3 and 4 outputs an imaging start signal a little later from the completion of reading to surely prevent the overlap in the memory unit 13. On the contrary, this example is to further achieve the improvement of throughput such as the reduction of a traveling time.

Moreover, FIG. 5 illustrates the timings of the second device described above as the imaging device.

As illustrated in FIG. 5, a time difference of $\Delta td$ exists between the input of an imaging start signal at the time t0 in FIG. 5(a) and the start of writing into the memory unit 3 in FIG. 5(d).

The object moving apparatus 20 performs control in consideration of this time difference $\Delta td$ and thus the imaging device can perform the imaging more efficiently.

As illustrated in FIGS. 5(a) and 5(e), the object moving apparatus 20 previously stores a time Tw from the output timing (the same as FIG. 5(a)) of the imaging start signal to the startable timing of the writing of the next image data after the imaging device performs the imaging and reads image data of the predetermined number of frames.

Then, when outputting the imaging start signal at the time t0, the object moving apparatus 20 starts clocking. When detecting that the movement of the object is completed, the object moving apparatus determines whether a time of "Tw-$\Delta td$" has passed from the time t0.

When the time "Tw-$\Delta td$" has not passed, the object moving apparatus continues clocking. On the other hand, when the time "Tw-$\Delta td$" has passed, the object moving apparatus outputs the next imaging start signal (time t1') as illustrated in FIG. 5(a).

As a result, the present device connected to the object moving apparatus 20 receives the next imaging start signal at the time t1' prior to the time t1 illustrated in FIGS. 3 and 4 and starts the imaging of an object. When reading out the image data of the 50th frame of the previous object from the memory unit 3, the present device can promptly start the writing and reading of image data of the first frame of this object.

Because the object moving apparatus 20 operates as illustrated in FIG. 5, the standby time of the imaging element 1 is further shortened and thus inspection can be further efficiently performed.

[Process in Video Signal Processing Unit]

Next, an example of signal processing in the video signal processing unit 4 of the present device will be explained.

[Compression Process]

In case of inspection applications, the imaging device captures a plurality of images for a stationary object while changing conditions such as exposure and illumination. Because such the image data can be easily compressed and transmitted, the video signal processing unit 4 of the present device performs a compression process.

In other words, the video signal processing unit 4 reads image data from the memory unit 3 at the transmission frame rate, performs a compression process on the image data, and outputs the compressed data to the interface output processing unit 5 at the transmission frame rate.

The video signal processing unit 4 predicts a pixel P(t) of the frame at a time "t" from the just previous frame (Equation (1)) by using weighted pixel value prediction (Weighted Prediction) employed by HEVC (High Efficiency Video Coding).

$$P(t)=W \times P(t-1)+O \qquad \text{Equation (1)}$$

Herein, without using the prediction of movement, the number of bits required to express one pixel value can be reduced by transmitting only the difference between a pixel value predicted by Equation (1) and a pixel value obtained from the actual image data.

Moreover, because the coefficient "W" is identical to a ratio of exposure between both frames, the coefficient is not required to be computed from a video signal. The constant number "O" can be easily computed as an average of differences when being predicted by only "W×P(t−1)".

Moreover, the coefficient "W" and constant number "O" are preferably transmitted once every frame or every area obtained by dividing a frame.

When the video has a movement, it is possible to use Mezzanine compression etc. known as a lightweight process.

[Control of Transmission Order]

The present device can transmit image data captured at a high imaging frame rate in an imaging order and also transmit the image data in an order different from the imaging order.

In such case, the video signal processing unit 4 first outputs and transmits images having highest significance in a subsequent-stage process or images or pixels required in an early-stage process to the interface output processing unit 5.

For example, in case of time-series image data that are captured while changing an object distance by using a microscope, it is expected that an image most suitable for the process is located near a center on a time axis.

In that case, it is preferable to first transmit the central image and then sequentially transmit untransmitted images close to the central image.

In that case, the present device previously decides a reading order from the memory unit 3 based on a priority order of frames. When a frame of the first reading order (priority order) is written, the video signal processing unit 5 promptly starts the reading to sequentially read image data from the memory unit 3 in accordance with the reading order.

As a result, for example, when determining the good or bad of the object based on the image data, the inspection device first receives an image most suitable for the determination. Therefore, when this object is bad, the inspection device can early determine its badness and can reduce a processing load thereof.

As described above, when the video signal processing unit 4 performs a compression process and the control of a transmission order, the inspection device receiving image data also performs a decompression process and a restoration process of the transmission order corresponding to them.

Effect of Embodiment

According to the first imaging device of the embodiment of the present invention, the imaging element 1 captures an image and outputs the image at a high imaging frame rate; the memory unit 3 stores image data captured by the imaging element 1; the video signal processing unit 4 reads the image data from the memory unit 3 at a transmission frame rate lower than the imaging frame rate and performs signal processing on the image data; the interface output processing unit 5 outputs the image data to the object moving apparatus at the transmission frame rate; and the control unit 6 outputs to the imaging element 1 an exposure period signal giving an instruction to capture a predetermined number of frames and outputs to the outside the exposure period signal as an imaging period signal indicating an imaging period. Therefore, the object moving apparatus 20 can recognize the completion of imaging based on the imaging period signal to start the movement of the object and can move the object during reading the image data to shorten the imaging interval. Furthermore, the throughput of inspection can be improved without dropping frames even if the existing output interface having band limiting is used.

Moreover, according to the second device according to the embodiment of the present invention, because the imaging period signal is a pulse signal that becomes a high level in synchronization with a timing at which the imaging element 1 starts to capture an object and becomes a low level at a timing at which the imaging of the predetermined number of frames for this object is terminated, the embodiment has an effect that the object moving apparatus 20 can easily detect the falling edge of the imaging period signal.

INDUSTRIAL APPLICABILITY

The present invention is suitable for the imaging device that can shorten inspection time without dropping images and thus can improve throughput.

DESCRIPTION OF REFERENCE NUMERALS 1, 11 . . . imaging element, 2, 12 . . . serial-parallel conversion unit, 3, 13 . . . memory unit, 4, 14 . . . video signal processing unit, 5, 15 . . . interface output processing unit, 6, 16 . . . control unit, 20 . . . object moving apparatus, 21 . . . control unit, 22 . . . moving means

What is claimed is:

1. An imaging device that captures an object, the imaging device comprising:
   an imaging unit that captures the object and outputs video data;
   a memory unit that stores therein the video data from the imaging unit by a specific number of frames;
   a video signal processing unit that reads the video data from the memory unit at a frame rate lower than a frame rate at which the video data are written into the memory unit and performs signal processing on the video data;
   an output interface unit that outputs to an external device the video data from the video signal processing unit at the low frame rate; and
   a control unit that outputs to the imaging unit an instruction to capture the specific number of frames and to write video data into the memory unit as an exposure period signal, instructs the video signal processing unit to output the video data from the memory unit at the low frame rate, and outputs to the external device an imaging period signal indicating an imaging period during which the specific number of frames are captured, when an imaging start signal is input from the external device.

2. The imaging device according to claim 1, wherein the imaging period signal is intermittent pulse signals to repeat an ON state and an OFF state in synchronization with the exposure period signal.

3. The imaging device according to claim 1, wherein the imaging period signal is a pulse signal to continue an ON state over an entire period in which a specific number of intermittent pulse signals for the exposure period signal are output.

* * * * *